US007731584B2

(12) United States Patent
Glavich et al.

(10) Patent No.: US 7,731,584 B2
(45) Date of Patent: Jun. 8, 2010

(54) GAMING DEVICE HAVING REGENERATING MULTIPLE AWARD OPPORTUNITIES

(75) Inventors: Paulina Glavich, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 126 days.

(21) Appl. No.: 11/426,234

(22) Filed: Jun. 23, 2006

(65) Prior Publication Data

US 2006/0246989 A1 Nov. 2, 2006

Related U.S. Application Data

(63) Continuation of application No. 09/960,784, filed on Sep. 21, 2001, now Pat. No. 7,066,814.

(51) Int. Cl.
*A63F 13/00* (2006.01)

(52) U.S. Cl. ............................ 463/20; 463/16; 463/18; 273/138.1; 273/139

(58) Field of Classification Search ..................... 463/1, 463/10–13, 16–21, 23, 25–27, 29–34; 273/138.1, 273/138.2, 141 A, 142 B, 142 C, 142 J, 139, 273/148 R, 429–432; *A63F 13/00*
See application file for complete search history.

(56) References Cited

U.S. PATENT DOCUMENTS 4,624,459 A 11/1986 Kaufman
4,669,731 A 6/1987 Clarke
4,695,053 A 9/1987 Vazquez, Jr. et al.
4,991,848 A 2/1991 Greenwood et al.
5,046,735 A 9/1991 Hamano et al.
5,152,529 A 10/1992 Okada
5,205,555 A 4/1993 Hamano
5,342,049 A 8/1994 Wichinsky et al.
5,393,057 A * 2/1995 Marnell, II .................. 463/13
5,393,061 A * 2/1995 Manship et al. ............... 463/20
5,395,111 A 3/1995 Inoue
5,407,200 A 4/1995 Zalabak (Continued)

FOREIGN PATENT DOCUMENTS

DE 4211440 10/1993

(Continued)

OTHER PUBLICATIONS

Elvis Brochure and Article written by IGT, published in 1999.

(Continued)

*Primary Examiner*—Peter DungBa Vo
*Assistant Examiner*—Arthur O. Hall
(74) *Attorney, Agent, or Firm*—K&L Gates LLP

(57) ABSTRACT

The present invention involves an apparatus and method for regenerating or awarding extra chances or opportunities to a player in connection with a gaming device and preferably in a bonus round of a gaming device. The present invention contemplates regenerating or awarding a plurality of extra chances or opportunities upon the occurrence of a predetermined event. More specifically, the present invention contemplates regenerating or awarding a number of extra chances or opportunities equal to the number of chances or opportunities with which the player enters or begins the game or bonus round of the present invention.

38 Claims, 7 Drawing Sheets

U.S. PATENT DOCUMENTS

| | | | | |
|---|---|---|---|---|
| 5,423,539 | A | 6/1995 | Nagao | |
| 5,449,173 | A | 9/1995 | Thomas et al. | |
| 5,456,465 | A | 10/1995 | Durham | |
| 5,560,603 | A | 10/1996 | Seelig et al. | |
| 5,611,535 | A | 3/1997 | Tiberio | |
| 5,630,753 | A * | 5/1997 | Fuchs | 463/9 |
| 5,647,798 | A | 7/1997 | Falciglia | |
| 5,655,961 | A | 8/1997 | Acres et al. | |
| 5,697,843 | A * | 12/1997 | Manship et al. | 463/20 |
| 5,704,835 | A * | 1/1998 | Dietz, II | 463/20 |
| 5,711,525 | A | 1/1998 | Breeding | |
| 5,722,891 | A | 3/1998 | Inoue | |
| 5,772,506 | A | 6/1998 | Marks et al. | |
| 5,775,692 | A | 7/1998 | Watts et al. | |
| 5,779,544 | A | 7/1998 | Seelig et al. | |
| 5,788,573 | A * | 8/1998 | Baerlocher et al. | 463/16 |
| 5,807,172 | A | 9/1998 | Piechowiak | |
| 5,823,873 | A | 10/1998 | Moody | |
| 5,823,874 | A | 10/1998 | Adams | |
| 5,833,537 | A | 11/1998 | Barrie | |
| 5,848,932 | A | 12/1998 | Adams | |
| 5,851,148 | A | 12/1998 | Brune et al. | |
| 5,855,514 | A | 1/1999 | Kamille | |
| 5,876,284 | A | 3/1999 | Acres et al. | |
| 5,882,261 | A | 3/1999 | Adams | |
| 5,910,048 | A * | 6/1999 | Feinberg | 463/25 |
| 5,911,418 | A | 6/1999 | Adams | |
| 5,918,880 | A | 7/1999 | Voigt, IV et al. | |
| 5,919,088 | A | 7/1999 | Weiss | |
| 5,935,002 | A | 8/1999 | Falciglia | |
| 5,947,820 | A * | 9/1999 | Morro et al. | 463/9 |
| 5,964,463 | A | 10/1999 | Moore, Jr. | |
| 5,971,849 | A | 10/1999 | Falciglia | |
| 5,980,384 | A * | 11/1999 | Barrie | 463/16 |
| 5,984,781 | A | 11/1999 | Sunaga | |
| 5,984,782 | A | 11/1999 | Inoue | |
| 5,988,638 | A | 11/1999 | Rodesch et al. | |
| 5,997,401 | A | 12/1999 | Crawford | |
| 6,003,867 | A | 12/1999 | Rodesch et al. | |
| 6,004,207 | A | 12/1999 | Wilson, Jr. et al. | |
| 6,012,982 | A | 1/2000 | Piechowiak et al. | |
| 6,015,346 | A | 1/2000 | Bennett | |
| 6,056,642 | A | 5/2000 | Bennett | |
| 6,059,289 | A | 5/2000 | Vancura | |
| 6,059,658 | A | 5/2000 | Mangano et al. | |
| 6,062,980 | A | 5/2000 | Luciano | |
| 6,089,976 | A | 7/2000 | Schneider et al. | |
| 6,089,977 | A | 7/2000 | Bennett | |
| 6,089,978 | A | 7/2000 | Adams | |
| 6,102,400 | A | 8/2000 | Scott et al. | |
| 6,102,798 | A | 8/2000 | Bennett | |
| 6,113,098 | A | 9/2000 | Adams | |
| 6,120,378 | A | 9/2000 | Moody et al. | |
| 6,126,541 | A | 10/2000 | Fuchs | |
| 6,126,542 | A * | 10/2000 | Fier | 463/16 |
| 6,142,873 | A | 11/2000 | Weiss et al. | |
| 6,142,874 | A | 11/2000 | Kodachi et al. | |
| 6,142,875 | A | 11/2000 | Kodachi et al. | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,168,523 | B1 | 1/2001 | Piechowiak et al. | |
| 6,173,955 | B1 * | 1/2001 | Perrie et al. | 273/146 |
| 6,174,233 | B1 | 1/2001 | Sunaga et al. | |
| 6,186,894 | B1 * | 2/2001 | Mayeroff | 463/20 |
| 6,190,254 | B1 | 2/2001 | Bennett | |
| 6,190,255 | B1 | 2/2001 | Thomas et al. | |
| 6,203,429 | B1 | 3/2001 | Demar et al. | |
| 6,217,448 | B1 | 4/2001 | Olsen | |
| 6,220,959 | B1 | 4/2001 | Holmes, Jr. et al. | |
| 6,224,482 | B1 | 5/2001 | Bennett | |
| 6,224,483 | B1 * | 5/2001 | Mayeroff | 463/20 |
| 6,227,971 | B1 | 5/2001 | Weiss | |
| 6,231,442 | B1 | 5/2001 | Mayeroff | |
| 6,231,445 | B1 | 5/2001 | Acres | |
| 6,234,879 | B1 | 5/2001 | Hasegawa et al. | |
| 6,234,897 | B1 * | 5/2001 | Frohm et al. | 463/20 |
| 6,238,287 | B1 | 5/2001 | Komori et al. | |
| 6,251,013 | B1 | 6/2001 | Bennett | |
| 6,261,128 | B1 | 7/2001 | Heim et al. | |
| 6,261,177 | B1 | 7/2001 | Bennett | |
| 6,270,409 | B1 * | 8/2001 | Shuster | 463/20 |
| 6,270,411 | B1 | 8/2001 | Gura et al. | |
| 6,270,412 | B1 * | 8/2001 | Crawford et al. | 463/20 |
| 6,290,600 | B1 * | 9/2001 | Glasson | 463/20 |
| 6,299,165 | B1 | 10/2001 | Nagano | |
| 6,302,790 | B1 | 10/2001 | Brossard | |
| 6,305,686 | B1 * | 10/2001 | Perrie et al. | 273/146 |
| 6,309,300 | B1 | 10/2001 | Glavich | |
| 6,311,976 | B1 | 11/2001 | Yoseloff et al. | |
| 6,312,334 | B1 | 11/2001 | Yoseloff | |
| 6,315,660 | B1 | 11/2001 | DeMar et al. | |
| 6,315,663 | B1 | 11/2001 | Sakamoto | |
| 6,328,649 | B1 | 12/2001 | Randall et al. | |
| 6,334,613 | B1 * | 1/2002 | Yoseloff | 273/292 |
| 6,334,864 | B1 | 1/2002 | Amplatz et al. | |
| 6,340,158 | B2 | 1/2002 | Price et al. | |
| 6,347,996 | B1 * | 2/2002 | Gilmore et al. | 463/17 |
| 6,364,766 | B1 | 4/2002 | Anderson et al. | |
| 6,364,768 | B1 * | 4/2002 | Acres et al. | 463/25 |
| 6,394,902 | B1 | 5/2002 | Glavich et al. | |
| 6,398,644 | B1 * | 6/2002 | Perrie et al. | 463/18 |
| 6,439,993 | B1 | 8/2002 | O'Halloran | |
| 6,443,452 | B1 | 9/2002 | Brune | |
| 6,471,208 | B2 | 10/2002 | Yoseloff et al. | |
| 6,481,713 | B2 | 11/2002 | Perrie et al. | |
| 6,491,584 | B2 * | 12/2002 | Graham et al. | 463/25 |
| 6,517,432 | B1 | 2/2003 | Jaffe | |
| 6,537,150 | B1 | 3/2003 | Luciano et al. | |
| 6,537,152 | B2 | 3/2003 | Seelig et al. | |
| 6,551,187 | B1 | 4/2003 | Jaffe | |
| 6,561,904 | B2 * | 5/2003 | Locke et al. | 463/25 |
| 6,565,436 | B1 | 5/2003 | Baerlocher | |
| 6,599,185 | B1 | 7/2003 | Kaminkow et al. | |
| 6,602,136 | B1 | 8/2003 | Baerlocher et al. | |
| 6,604,740 | B1 | 8/2003 | Singer et al. | |
| 6,641,477 | B1 * | 11/2003 | Dietz, II | 463/20 |
| 6,648,757 | B1 * | 11/2003 | Slomiany et al. | 463/20 |
| 6,663,489 | B2 | 12/2003 | Baerlocher | |
| 6,685,563 | B1 * | 2/2004 | Meekins et al. | 463/25 |
| 6,705,944 | B2 | 3/2004 | Luciano | |
| 6,733,389 | B2 | 5/2004 | Webb et al. | |
| 6,739,971 | B2 * | 5/2004 | Devaull | 463/20 |
| 6,773,345 | B2 * | 8/2004 | Walker et al. | 463/17 |
| 6,776,711 | B1 | 8/2004 | Baerlocher | |
| 6,780,105 | B1 | 8/2004 | Kaminkow | |
| 6,811,483 | B1 | 11/2004 | Webb et al. | |
| 6,855,052 | B2 | 2/2005 | Weiss et al. | |
| 6,869,360 | B2 | 3/2005 | Marks et al. | |
| 6,890,257 | B2 | 5/2005 | Baerlocher | |
| 6,899,620 | B2 | 5/2005 | Kaminkow et al. | |
| 6,908,383 | B2 | 6/2005 | Baerlocher et al. | |
| 6,913,532 | B2 | 7/2005 | Baerlocher et al. | |
| 6,955,600 | B2 | 10/2005 | Glavich et al. | |
| 6,960,134 | B2 | 11/2005 | Hartl et al. | |
| 6,984,174 | B2 * | 1/2006 | Cannon et al. | 463/25 |
| 7,004,835 | B2 | 2/2006 | Baerlocher | |
| 7,008,319 | B2 * | 3/2006 | Montgomery et al. | 463/21 |
| 7,052,395 | B2 | 5/2006 | Glavich et al. | |
| 7,056,213 | B2 | 6/2006 | Ching et al. | |
| 7,066,814 | B2 | 6/2006 | Glavich et al. | |

| | | | | |
|---|---|---|---|---|
| 7,070,501 | B2 | 7/2006 | Cormack et al. | |
| 7,074,127 | B2 | 7/2006 | Cuddy et al. | |
| 7,090,580 | B2 | 8/2006 | Rodgers et al. | |
| 7,094,148 | B2 | 8/2006 | Baerlocher et al. | |
| 7,121,942 | B2 | 10/2006 | Baerlocher | |
| 7,235,011 | B2 | 6/2007 | Randall et al. | |
| 7,238,110 | B2 | 7/2007 | Glavich et al. | |
| 7,258,611 | B2 | 8/2007 | Bigelow, Jr. et al. | |
| 7,322,887 | B2 | 1/2008 | Belger et al. | |
| 7,326,109 | B2 | 2/2008 | Baerlocher | |
| 7,331,862 | B2 | 2/2008 | Rodgers et al. | |
| 7,331,866 | B2 | 2/2008 | Rodgers et al. | |
| 7,331,867 | B2 | 2/2008 | Baerlocher et al. | |
| 7,341,513 | B2 | 3/2008 | Cuddy et al. | |
| 7,357,716 | B2 | 4/2008 | Marks et al. | |
| 7,381,134 | B2 | 6/2008 | Cuddy et al. | |
| 7,384,334 | B2 | 6/2008 | Glavich et al. | |
| 7,402,103 | B2 | 7/2008 | Baerlocher | |
| 7,473,174 | B2 | 1/2009 | Cuddy et al. | |
| 7,534,168 | B2 * | 5/2009 | Bennett et al. | 463/20 |
| 7,582,012 | B2 * | 9/2009 | Walker et al. | 463/17 |
| 2001/0009865 | A1 | 7/2001 | Demar et al. | |
| 2002/0010017 | A1 * | 1/2002 | Bennett | 463/20 |
| 2002/0052233 | A1 | 5/2002 | Gauselmann | |
| 2002/0086725 | A1 * | 7/2002 | Fasbender et al. | 463/11 |
| 2002/0151354 | A1 * | 10/2002 | Boesen et al. | 463/25 |
| 2003/0022712 | A1 * | 1/2003 | Locke | 463/20 |
| 2003/0060272 | A1 | 3/2003 | Glavich et al. | |
| 2004/0048649 | A1 | 3/2004 | Peterson et al. | |
| 2004/0063493 | A1 | 4/2004 | Baerlocher | |
| 2004/0152500 | A1 | 8/2004 | Baerlocher | |
| 2004/0242302 | A1 | 12/2004 | Baerlocher | |
| 2004/0266512 | A1 | 12/2004 | Kaminkow | |
| 2005/0020346 | A1 | 1/2005 | Baerlocher | |
| 2005/0075163 | A1 | 4/2005 | Cuddy et al. | |
| 2005/0233796 | A1 | 10/2005 | Baerlocher et al. | |
| 2006/0003827 | A1 | 1/2006 | Hartl et al. | |
| 2006/0009277 | A1 | 1/2006 | Hartl et al. | |
| 2006/0063585 | A1 | 3/2006 | Cuddy | |
| 2006/0068884 | A1 | 3/2006 | Baerlocher et al. | |
| 2006/0068885 | A1 | 3/2006 | Cregan et al. | |
| 2006/0073876 | A1 | 4/2006 | Cuddy | |
| 2006/0084494 | A1 | 4/2006 | Belger et al. | |
| 2006/0199636 | A1 | 9/2006 | Ching et al. | |
| 2006/0199637 | A1 | 9/2006 | Ching et al. | |
| 2007/0010316 | A1 | 1/2007 | Baerlocher et al. | |
| 2007/0021188 | A1 | 1/2007 | Rodgers et al. | |
| 2007/0049372 | A1 | 3/2007 | Olivas et al. | |
| 2007/0060294 | A1 | 3/2007 | Cuddy et al. | |
| 2007/0087809 | A1 | 4/2007 | Baerlocher | |
| 2007/0281778 | A1 | 12/2007 | Bigelow, Jr. et al. | |
| 2007/0287521 | A1 | 12/2007 | Glavich et al. | |
| 2008/0113760 | A1 | 5/2008 | Baerlocher | |
| 2008/0113779 | A1 | 5/2008 | Cregan | |
| 2008/0139296 | A1 | 6/2008 | Baerlocher et al. | |
| 2008/0139298 | A1 | 6/2008 | Rodgers et al. | |
| 2008/0153584 | A1 | 6/2008 | Cuddy et al. | |
| 2008/0200232 | A1 | 8/2008 | Baerlocher et al. | |
| 2008/0200237 | A1 | 8/2008 | Cuddy et al. | |
| 2008/0220851 | A1 | 9/2008 | Glavich et al. | |

FOREIGN PATENT DOCUMENTS

| | | | | |
|---|---|---|---|---|
| DE | 4211443 | | | 10/1993 |
| EP | 60 019 | A1 | | 9/1982 |
| EP | 0 874 337 | A1 | | 10/1998 |
| EP | 0926645 | A2 | | 6/1999 |
| EP | 0 981 119 | A2 | | 2/2000 |
| GB | 2072395 | A | * | 9/1981 |
| GB | 2 101 380 | A | | 1/1983 |
| GB | 2197974 | A | * | 6/1988 |
| GB | 2 262 642 | A | | 6/1993 |
| GB | 2262642 | A | * | 6/1993 |
| GB | 2 322 217 | A | | 8/1998 |
| WO | WO 97 32285 | | | 9/1997 |
| WO | WO 00/32286 | | | 6/2000 |
| WO | WO 01/26019 | A2 | | 4/2001 |

OTHER PUBLICATIONS

Little Devils Brochure, written by IGT, published on or before Dec. 1998.
Slot Machines Article, written by Marshall Fey, published by Reno-Tahoe Specialty, Inc., published in 1989.
Slotopoly Brochure by IGT, published in 1998.
Top Dollar Brochure written by IGT, published in 1998.
Tropical Fever Glass, written by IGT, published prior to Apr. 2001.
Wheel of Fortune Video Brochure, written by IGT, published 1999.
Winning Streak Brochure, written by Aristocrat, published in 1994.

* cited by examiner

GAMING DEVICE HAVING REGENERATING MULTIPLE AWARD OPPORTUNITIES

PRIORITY CLAIM

This application is a continuation of and claims the benefit of U.S. patent application Ser. No. 09/960,784, filed Sep. 21, 2001, now U.S. Pat. No. 7,066,814, the entire contents of which are incorporated herein.

CROSS-REFERENCE TO RELATED APPLICATIONS

This application is related to the following commonly-owned co-pending patent applications: "GAMING DEVICE HAVING A BONUS GAME WITH MULTIPLE PLAYER SELECTABLE AWARD OPPORTUNITIES," Ser. No. 10/237,207, "GAMING DEVICE HAVING FREE SPIN MODE WITH SYMBOL ELIMINATION," Ser. No. 10/953,818, "GAMING DEVICE WITH CHANGING WILD SYMBOLS," Ser. No. 10/956,303, "GAMING DEVICE HAVING FREE SPIN GAME WITH TERMINATORS AND ANTI-TERMINATORS," Ser. No. 11/210,314, "GAMING MACHINE INCLUDING REDO FEATURE," Ser. No. 11/215,790, "GAMING DEVICE HAVING A FREE SPIN GAME INCLUDING AN ACCUMULATED MODIFIER," Ser. No. 11/216,323, "GAMING DEVICE AND METHOD HAVING FREE ACTIVATION MODE AND FREE ACTIVATION MODE WITH FREE ACTIVATION RE-TRIGGER," Ser. No. 11/217,182, "GAMING DEVICE HAVING A PUZZLE FUNCTION OPERABLE TO INDICATE INFORMATION RELATED TO A GAME EVENT," Ser. No. 11/220,470, "GAMING DEVICE HAVING AN INDICATOR OPERABLE TO INDICATE PRIMARY GAME OUTCOMES AND ASSOCIATED BONUS GAME OPPORTUNITIES," Ser. No. 11/223,865, "GAMING DEVICE HAVING A PROBABILITY ENHANCING TRIGGER SYMBOL," Ser. No. 11/419,680, "GAMING DEVICE HAVING A PROBABILITY ENHANCING TRIGGER SYMBOL," Ser. No. 11/419,681, "GAMING DEVICE HAVING A PROBABILITY ENHANCING TRIGGER SYMBOL," Ser. No. 11/456,016, "GAMING DEVICE HAVING A FREE SPIN GAME," Ser. No. 11/459,872, "GAMING DEVICE INCLUDING A GAME HAVING A WILD SYMBOL RELATED AWARD," Ser. No. 11/464,347, "GAMING DEVICE HAVING A FREE SPIN GAME," Ser. No. 11/465,734, "GAMING DEVICE INCLUDING A GAME HAVING A PLAYER SELECTED FUNCTION BASED ON SYMBOLS IN A FREE SPINS GAME," Ser. No. 11/549,855, "GAMING SYSTEM AND METHOD HAVING PROGRESSIVE FREE GAMES," Ser. No. 11/558,699, "GAMING DEVICE HAVING A RE-TRIGGERING SYMBOL BONUS SCHEME WITH A BONUS SYMBOL ACCUMULATOR," Ser. No. 11/771,740, "GAMING DEVICE HAVING FREE GAME BONUS WITH A CHANGING MULTIPLIER," Ser. No. 11/840,048, "GAMING DEVICE AND METHOD PROVIDING SIDE BET FOR WINNING FREE ACTIVATIONS," Ser. No. 11/873,948, "GAMING DEVICE AND METHOD FOR PROVIDING PLAYER SELECTION OF MODIFIERS TO GAME COMPONENTS," Ser. No. 11/877,508, "GAMING DEVICE AND METHOD FOR PROVIDING A FREE SPIN GAME WITH PAYLINE MULTIPLIERS," Ser. No. 11/937,814, "GAMING DEVICE HAVING AN AWARD DISTRIBUTOR AND AN AWARD ACCUMULATOR BONUS GAME," Ser. No. 12/014,491, "GAMING DEVICE HAVING SEQUENTIAL ACTIVATIONS OF A GAME AND REPLAY OF PREVIOUS ACTIVATIONS OF THE GAME," Ser. No. 12/014,533, "GAMING DEVICE HAVING A RE-TRIGGERING SYMBOL BONUS SCHEME," Ser. No. 12/031,629, "GAMING DEVICE HAVING MATCH GAME WITH AWARD DETERMINED BY PREDICTION OF CORRECT MATCHES," Ser. No. 12/041,294, "SLOT MACHINE GAME HAVING A PLURALITY OF WAYS TO ISSUE A PERCENTAGE OF A PROGRESSIVE AWARD BASED UPON ANY WAGER LEVEL ("PERCENTAGE PROGRESSIVE")," Ser. No. 12/054,268, "GAMING DEVICE HAVING A MULTI-FUNCTION FREE GAME BONUS," Ser. No. 12/105,990, and "GAMING DEVICE HAVING DIFFERENT SETS OF PRIMARY AND SECONDARY REEL SYMBOLS," Ser. No. 12/125,586.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device that regenerates or retriggers multiple award opportunities on a physical or mechanical display device.

BACKGROUND

The base or primary game of most slot machines involves one or more mechanical or video spinning reels, each of which display a plurality of symbols. In many games, a symbol or combination of symbols yield one or more opportunities or chances in a bonus or secondary game, which is played in addition to the base game. In some instances, when the player uses one of the chances, the bonus game provides an award to the player and enables the player to have an extra opportunity or chance. Examples of this type of game include the "Spin 'till You Win", "Queen of the Nile" and "Jackpot Party" games.

Known games provide a single retry or a single extra award generation opportunity. These games provide the player a limited benefit. Gaming device manufacturers constantly strive to develop more exciting and more entertaining games. One method, described below, for providing a more exciting and entertaining game is to provide a regeneration or retriggering device that enables the player to obtain multiple retries or multiple extra award generation opportunities.

SUMMARY

The present invention provides an apparatus and method for regenerating or awarding extra chances or opportunities to a player in connection with a gaming device and preferably in a bonus round of a gaming device. The present invention contemplates regenerating or awarding a plurality of extra chances or opportunities upon the occurrence of a predetermined event. More specifically, the present invention contemplates regenerating or awarding a number of extra chances or opportunities equal to or based on the random number of chances or opportunities with which the player enters or begins the game or bonus round.

In one preferred embodiment, the player plays the base game of a slot machine by spinning one or more reels, each of which display a plurality of symbols. If the player generates a first predetermined symbol or symbol combination, the game provides a first predetermined number of chances in the bonus round. If the player generates a second predetermined symbol or symbol combination, the game provides a second predetermined number of chances in the bonus round, and so on. It should be appreciated that base games typically display symbols, such as video poker where the cards are symbols.

In an alternative embodiment, the player chooses a masked selection in the bonus game which hides a value. The revealed value corresponds to the number of chances the player has in the bonus round.

In the bonus round of the preferred embodiment of the present invention, the bonus game employs a random generation device, wherein the player randomly generates awards as well as a retry or a re-spin for use in the bonus game. Upon generating a retry or re-spin, the present invention preferably provides the player with the number of chances with which the player entered the bonus round. For example, if the player enters the bonus round with or has in the bonus round five spins of a wheel, and the player generates a retry or re-spin of the present invention on the fourth spin, the game provides the player with five extra spins in the bonus round. In an alternative embodiment, the game provides a number of free games as opposed to a number of free games, a number of retries or re-spins.

Further alternatively, the gaming device provides a number of retries based on the original number of spins. For instance, if the player hits on the fourth of five allotted spins, the gaming device may be adapted to provide the number used (four) or the number remaining (one).

It is therefore an advantage of the present invention to provide a gaming device having a bonus game which regenerates or provides a plurality of extra award-producing chances or opportunities upon the occurrence of a predetermined event.

Other objects, features and advantages of the invention will be apparent from the following detailed disclosure, taken in conjunction with the accompanying sheets of drawings, wherein like numerals refer to like parts, elements, components, steps and processes.

Additional features and advantages are described herein, and will be apparent from, the following Detailed Description and the figures.

DETAILED DESCRIPTION

Gaming Device and Electronics

Figure 1A:
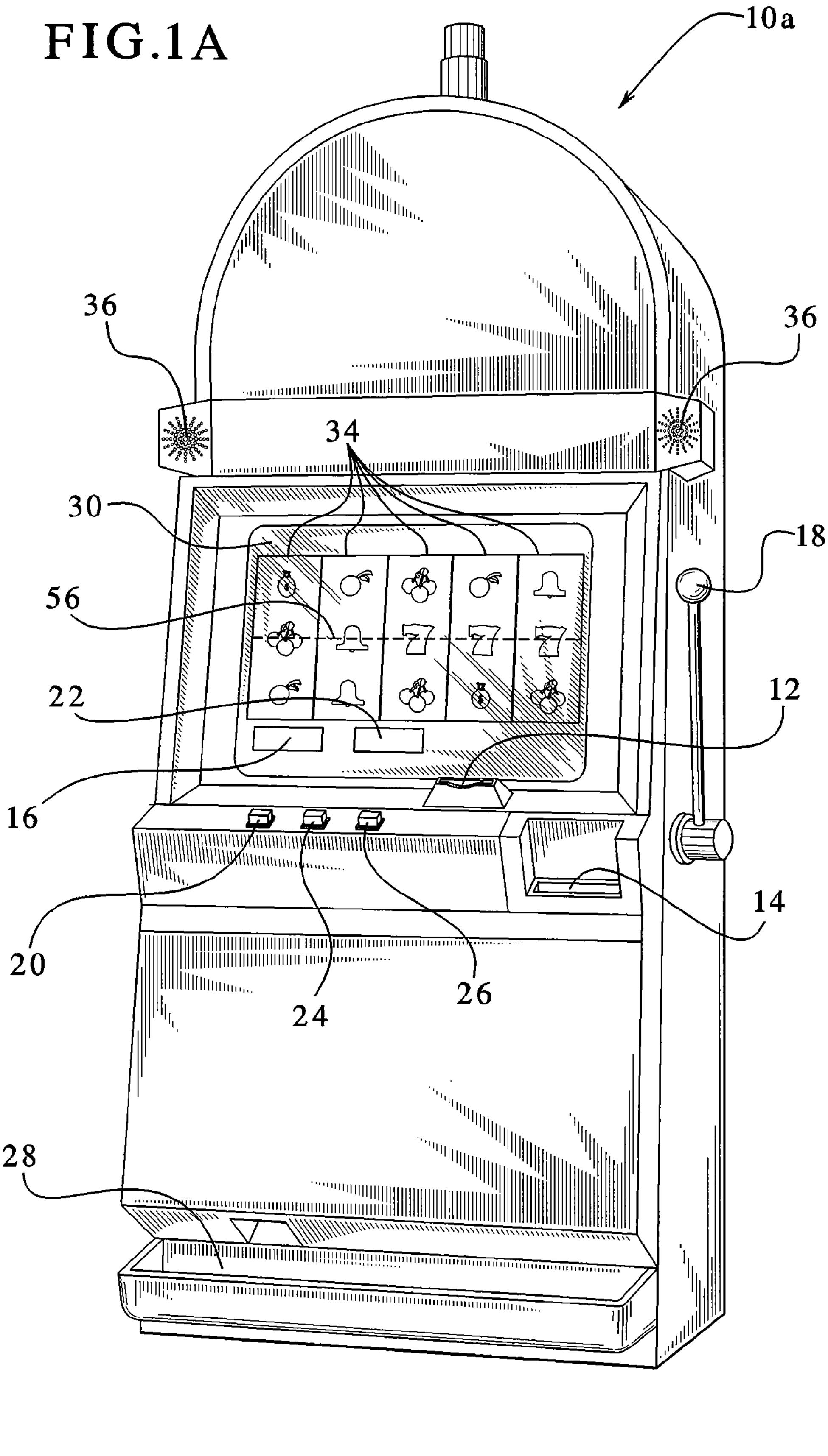
FIG. 1A is a front-side perspective view of one embodiment of the gaming device of the present invention.
Figure 1B:
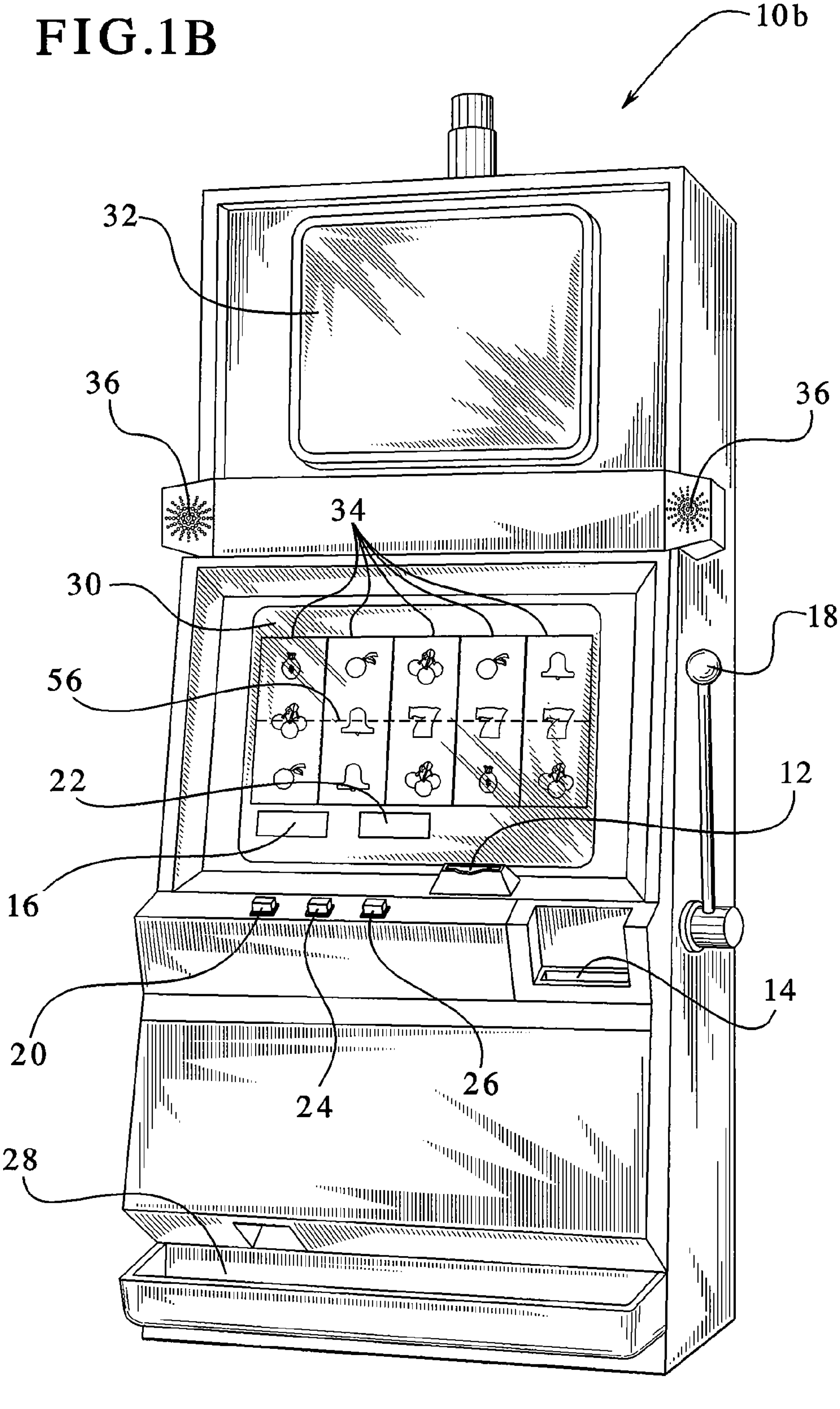
FIG. 1B is a front-side perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit vouchers redeemable by a cashier or electronically recordable cards, which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
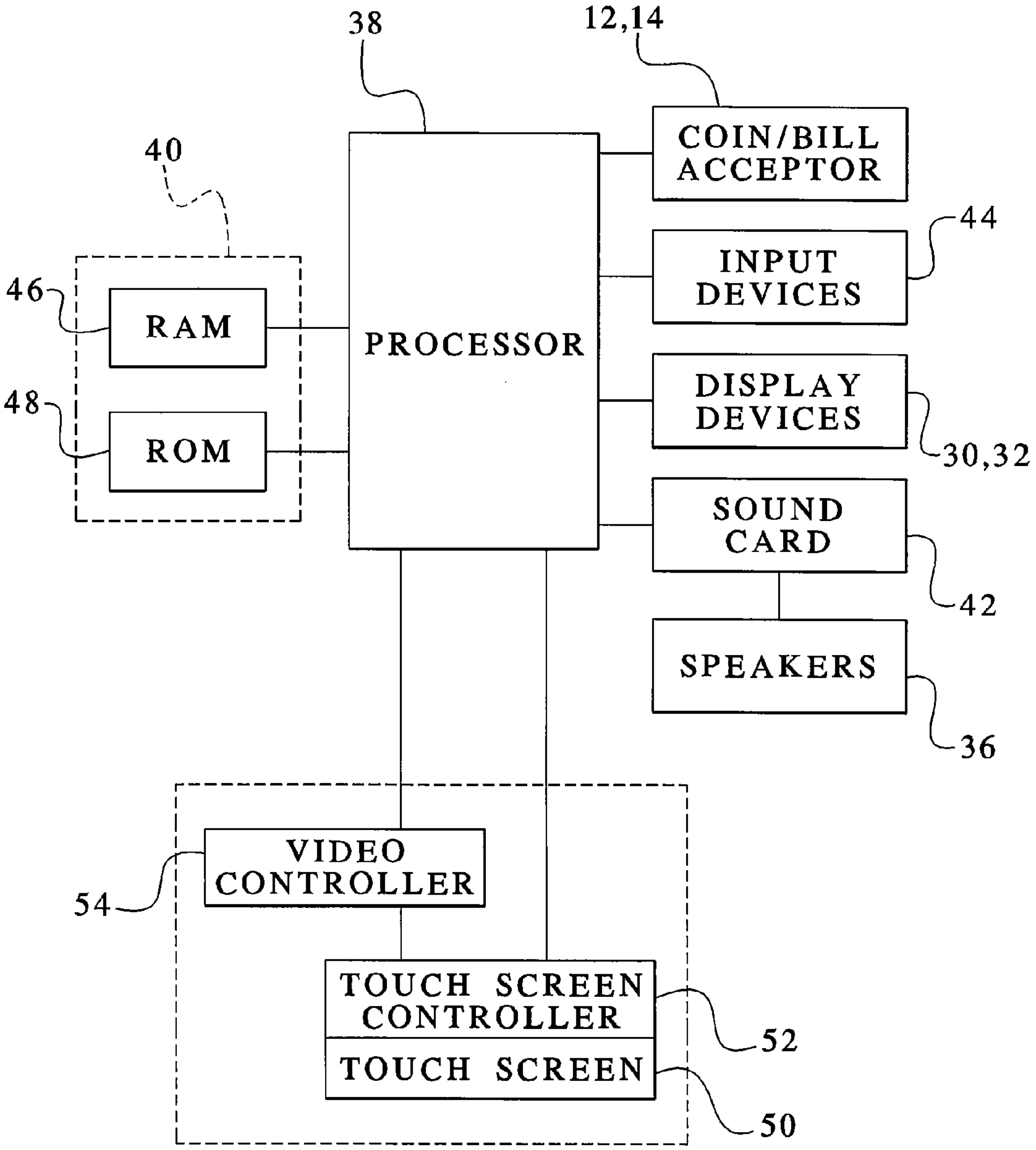
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or the "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program that will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Operation of the Gaming Device

Figure 3:
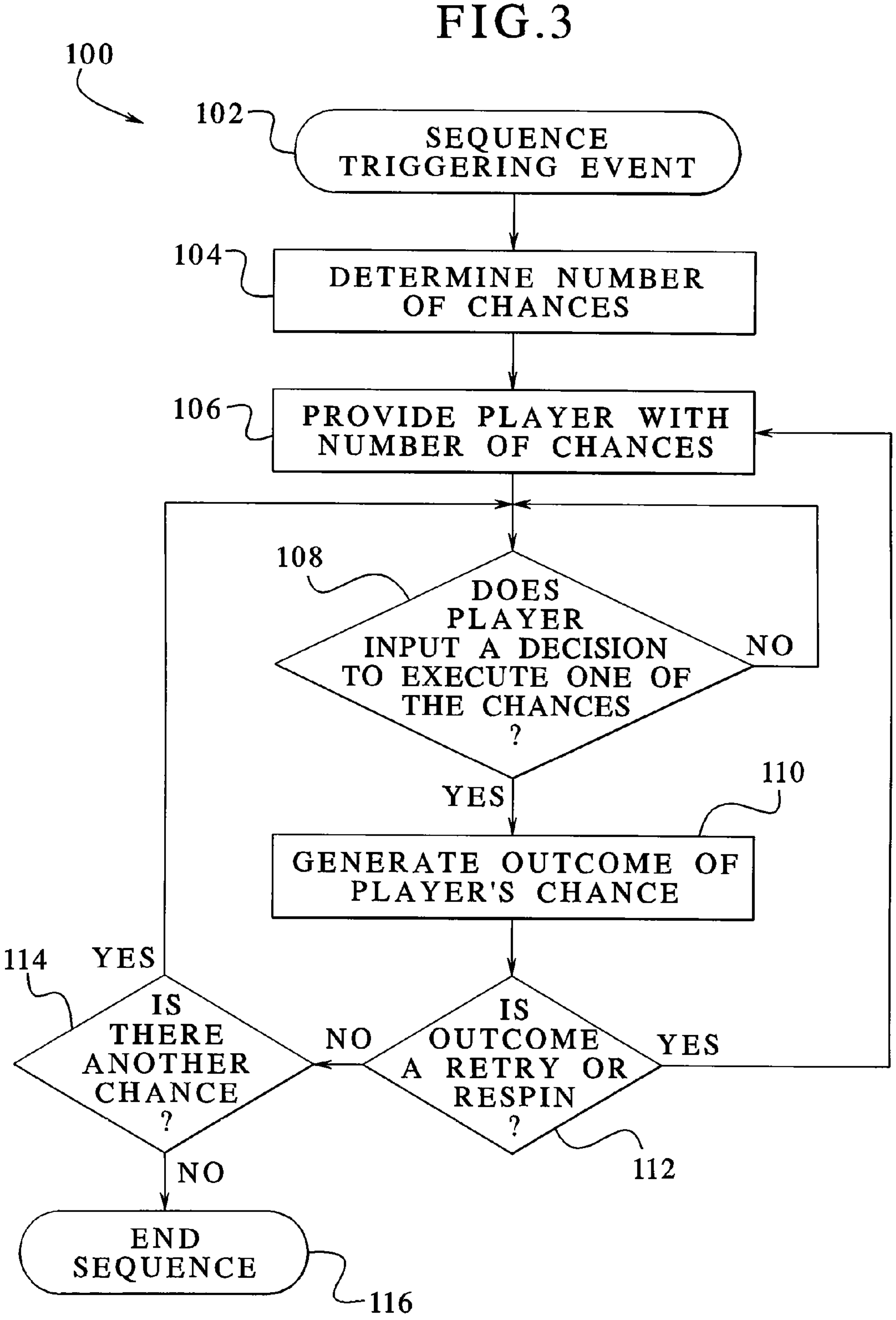
FIG. 3 is a flow diagram of one preferred embodiment of the method of the present invention, wherein the game provides a previously determined number of chances upon the generation of a retry.

Referring now to FIG. 3, a method 100 of one preferred embodiment of the present invention begins upon a sequence triggering event, as indicated by the oval 102. As described with respect to FIGS. 1A and 1B, the sequence triggering event, in a stand-alone embodiment, can be the deposit of an appropriate amount of money. The sequence triggering event, in a bonus game embodiment, can be a certain symbol or combination of symbols appearing on a payline 56 or in a scattered pay arrangement. A scatter pay arrangement usually requires a plurality of symbols anywhere on one of the display devices. That is, the game does not require the combination of symbols to appear along any given payline.

In other gaming devices, the bonus triggering event can be any event designated by the implementor such as a full house in a video poker gaming machine. After the occurrence of the sequence triggering event, the game determines a number of chances or opportunities that the player has at generating an award, as indicated by the block 104. The present invention contemplates the game predetermining the same number of chances each time a game begins. The present invention also contemplates the game predetermining or randomly determining a different number of chances each time a game begins.

More specifically, referring to FIGS. 1A and 1B, a game employing the present invention can predetermine the chances or opportunities that the player has at generating an award based upon the number of a certain symbol that appears on adjacent reels 34 along a payline 56. For example, the game can maintain a database (not illustrated) such that the game provides the player with three chances if the game randomly generates three adjacent "7" symbols, five chances if the game generates five adjacent "7" symbols and seven chances if the game generates five adjacent "7" symbols. The game can employ any chance or opportunity distribution.

In another embodiment, a game employing the present invention can maintain a database (not illustrated) such that the game randomly chooses one number from a range of possible numbers of chances. For example, the game can randomly choose between two to five chances if the game randomly generates three adjacent "7" symbols. The game can randomly choose between three to eight chances if the game generates four adjacent "7" symbols. The game can randomly choose between five to ten chances if the game generates five adjacent "7" symbols.

In a further embodiment, the game employing the present invention can maintain a database (not illustrated) such that the game randomly chooses one number from a weighted range of possible numbers of chances, such that the game selects at least one number more often than at least one other. For example, the game can randomly choose between two to five chances if the game randomly generates three adjacent "7" symbols, wherein there is a 20% chance of choosing a two, a 30% chance of choosing a three, a 30% chance of choosing a four and a 20% chance of choosing a five. The game can randomly choose between three to eight chances if the game generates five adjacent "7" symbols, wherein there is a 10% chance of choosing a three, four, seven and eight and a 30% chance of choosing a five and a six. The game can randomly choose between four to ten chances if the game generates five adjacent "7" symbols, wherein there is a 10% chance of choosing a four, five, six, nine and ten and a 25% chance of choosing a seven and an eight. Other symbols and probabilities can be implemented in accordance with the present invention.

Referring again to FIG. 3, after determining the number of chances, as indicated by the block 104, the game employing the present invention provides the player with the number of chances at generating an award, as indicated by the block 106. The game then awaits an input from the player executing one of the chances, as indicated by the diamond 108. The present invention contemplates a game employing any random outcome generation device for executing one of the chances. The present invention includes employing one or more spinning wheels, one or more spinning reels, one or more playing cards, a light display, meter, scale of other type of random generation device.

If the player does not input a decision to execute one of the chances, the game re-enables the player to input such a decision and thereby creates a loop that continues until the player inputs the decision. The game can provide any suitable prompt (not illustrated), during the loop, urging the player to input a decision to execute one of the chances. If the player inputs a decision to execute one of the chances, as indicated by a positive response to the diamond 108, the game employing the present invention generates an outcome of the player's chance or opportunity, as indicated by the block 110. The present invention contemplates a game generating any outcome desired by the implementor including, but not limited to: no award; a retry or re-spin; an award of any value; an award in combination with a retry or re-spin; a number of free games; and a number of free games in combination with a number of re-spins and/or an award.

The game then determines whether the outcome or a component of the outcome includes a retry or re-spin, as indicated by the diamond 112. If the outcome or a component of the outcome does not include a retry or re-spin, the game determines whether another chance or opportunity exists, as indicated by the diamond 114. If another chance or opportunity exists, the game re-enables the player to input a decision to execute a chance or opportunity, as indicated by the diamond 108. If another chance or opportunity does not exist, the game sequence ends.

If the outcome or a component of the outcome includes a retry or re-spin, as indicated by a positive outcome of the diamond 112, the present invention provides the player with the previously determined number of chances or opportunities, as indicated by the block 106. Alternatively, the game may be adapted to provide the player with the previously determined number free games. The present invention thus enables the player to accumulate chances or opportunities. A game employing the present invention preferably does not end until the player exhausts all chances or opportunities, as indicated by diamond 114.

Figure 4:
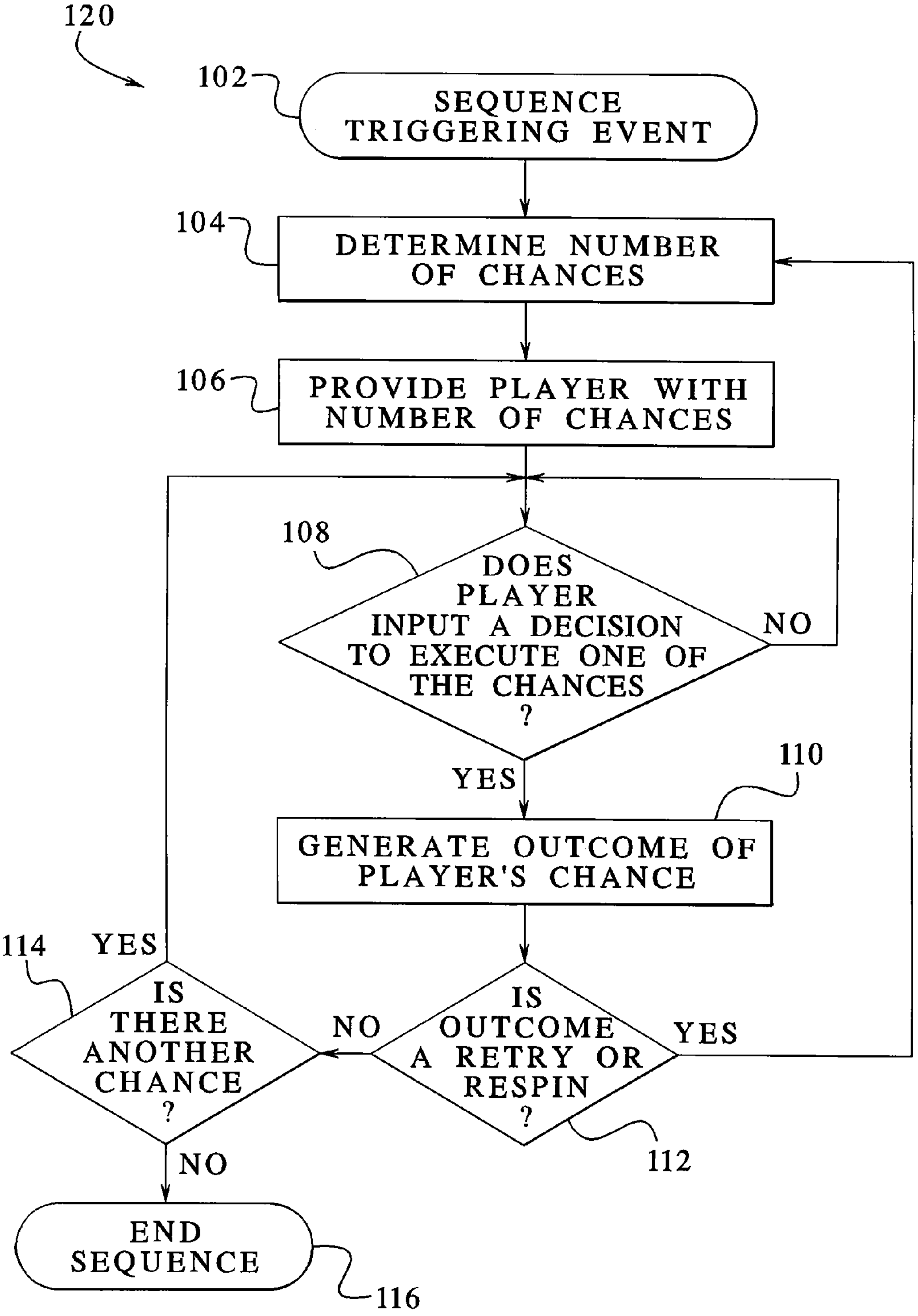
FIG. 4 is a flow diagram of one alternative embodiment of the method of the present invention, wherein the game re-determines a number of chances upon the generation of a retry.

Referring now to FIG. 4, a method 120 of an alternative embodiment of the present invention begins upon the occurrence of a sequence triggering event. The embodiment of FIG. 4 operates in the same manner as the embodiment of FIG. 3, except that in this alternative embodiment, the game re-determines the number of chances or opportunities that the player has at achieving an award after the game randomly generates a retry or re-spin. Or, the gaming device 10 redetermines a number of free games to provide to the player after the game runs.

In the preferred embodiment of FIG. 3, the game automatically awards the previously determined number. Here, if the outcome or a component of the outcome includes a retry or re-spin, the game determines a number of chances or opportunities that the player has at generating an award, as indicated by the block 104. This embodiment includes predetermining or randomly determining any number of chances after generating a retry or re-spin. This alternative embodiment also enables the player to accumulate chances or opportunities.

This embodiment further includes predetermining or randomly determining a number of chances or opportunities based on, e.g., less than, equal to or more than the number of chances initially determined. In one example, the game initially randomly determines and provides the player with five chances or opportunities and predetermines that the game provides the player with three additional chances each time the game generates a retry or re-spin. In another example, the game initially predetermines and provides the player with three chances or opportunities and randomly determines that the game provides the player with two to five additional chances each time the game generates a retry or re-spin. In a further example, gaming device 10 provides a number of additional chances equal to the number of attempts made or the number of attempts remaining.

Figure 5:
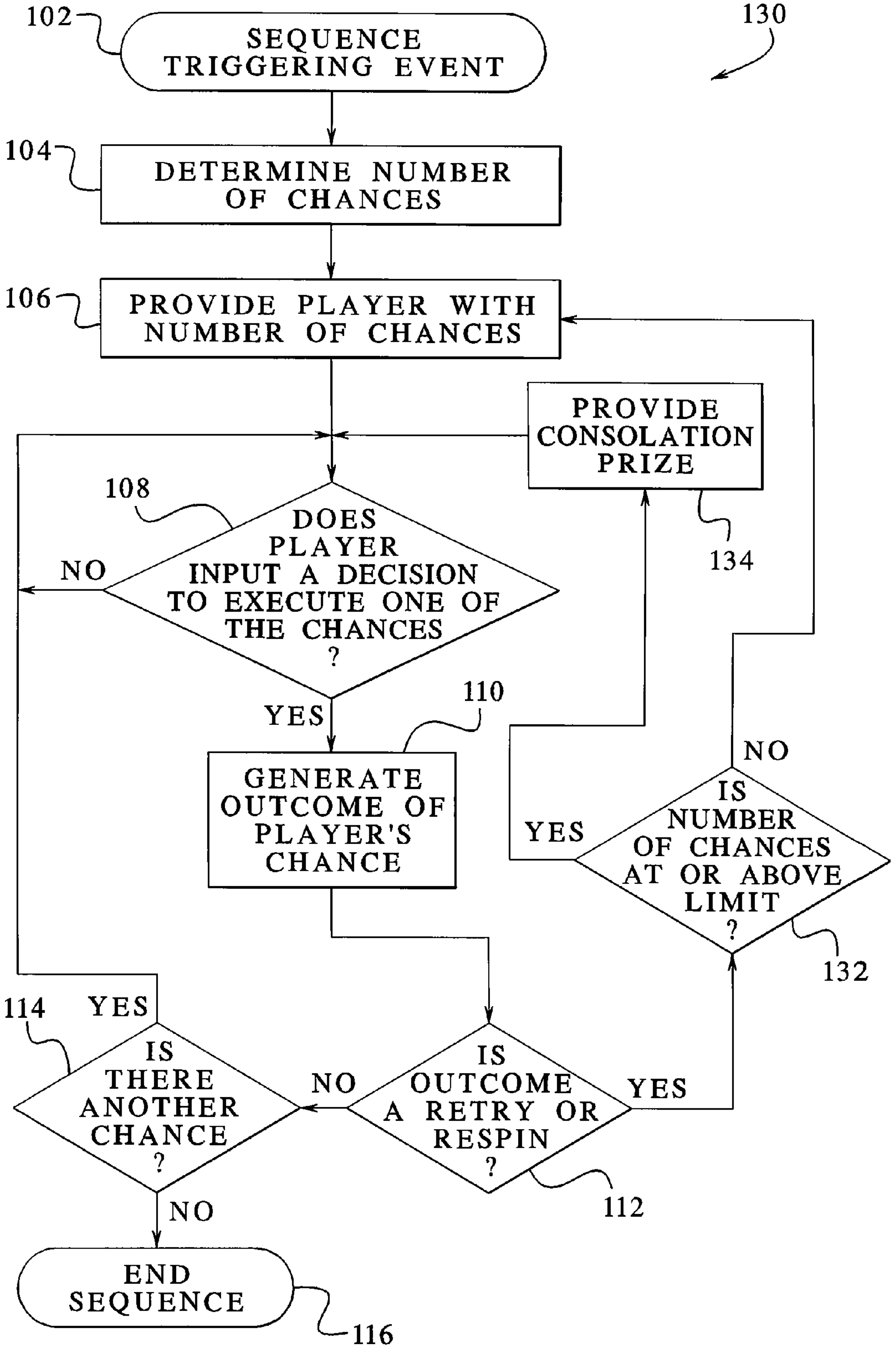
FIG. 5 is a flow diagram of another alternative embodiment of the method of the present invention, wherein the game places a limit on the number of chances that a player can accrue.

Referring now to FIG. 5, a method 130 of a further alternative embodiment of the present invention includes a limit on the number of chances that a player can accrue. The embodiment of FIG. 5 operates exactly the same as the embodiment of FIG. 3, except that in the further alternative embodiment of FIG. 5, the game places a governor or a limit on the total number of chances or attempts that the player can accrue. In the embodiments of FIGS. 3 and 4, the game enables the player to accrue any number of chances or opportunities. Here, if the outcome or a component of the outcome includes a retry or re-spin, the game determines whether the current number of chances or opportunities is at or above a predetermined limit, as indicated by the diamond 132. If the number of chances or opportunities is not at or above a predetermined limit, the game provides the player with a previously determined number of chances, as indicated by the block 106. This further alternative embodiment also contemplates re-determining a number of chances as described with respect to FIG. 4.

If the number of chances or opportunities is at or above a predetermined limit, the game preferably provides the player with a consolation prize in lieu of additional chances, as indicated by the block 134, and enables the player to continue executing award generating chances. The present invention alternatively does not have to provide a consolation prize.

In the further alternative embodiment, the present invention contemplates enabling the game to exceed the limit after one generation of a retry and thereafter not allowing the game to provide additional chances or opportunities. That is, if the player currently has nine chances or opportunities, the game has a ten chance or opportunity limit and the game automatically provides three additional chances upon the generation of a retry or re-spin, the present invention includes awarding the three chances upon a retry, bringing the player's total to twelve, and thereafter not allowing additional chances.

In the further alternative embodiment, the present invention contemplates not enabling the game to exceed the limit, even if the player obtains a retry or re-spin when the player's total number of chances is below a limit. That is, if the player currently has nine chances or opportunities, the game has a ten chance or opportunity limit and the game automatically provides three additional chances upon the generation of a retry or re-spin, the present invention includes awarding only one of three chances upon a retry, bringing the player's total to the limit of ten, and thereafter not allowing additional chances.

In the further alternative embodiment, the present invention contemplates not providing any additional chances when the determined number of chances would exceed the limit, even if the player obtains a retry or re-spin when the player's total number of chances is below a limit. That is, if the player currently has nine chances or opportunities, the game has a ten chance or opportunity limit and the game randomly generates two additional chances upon the generation of a retry or re-spin, the present invention includes awarding neither of the two chances, leaving the player with a total of nine. In the example, if the game randomly generates one additional chance upon the generation of a retry or re-spin, the game awards the chance, bringing the player's total to the limit of ten.

In the further alternative embodiment, the gaming device 10 in one implementation counts the number of re-spins that the player makes and applies the limit accordingly. That is, if the gaming device maintains a limit of ten, the player has already made six re-spins, has three remaining re-spins and generates two additional re-spins, the gaming device 10 can: (i) not award the two new re-spins; (ii) award one re-spin; or (iii) award both re-spins but provide no further re-spins.

Implementation

Figure 6:
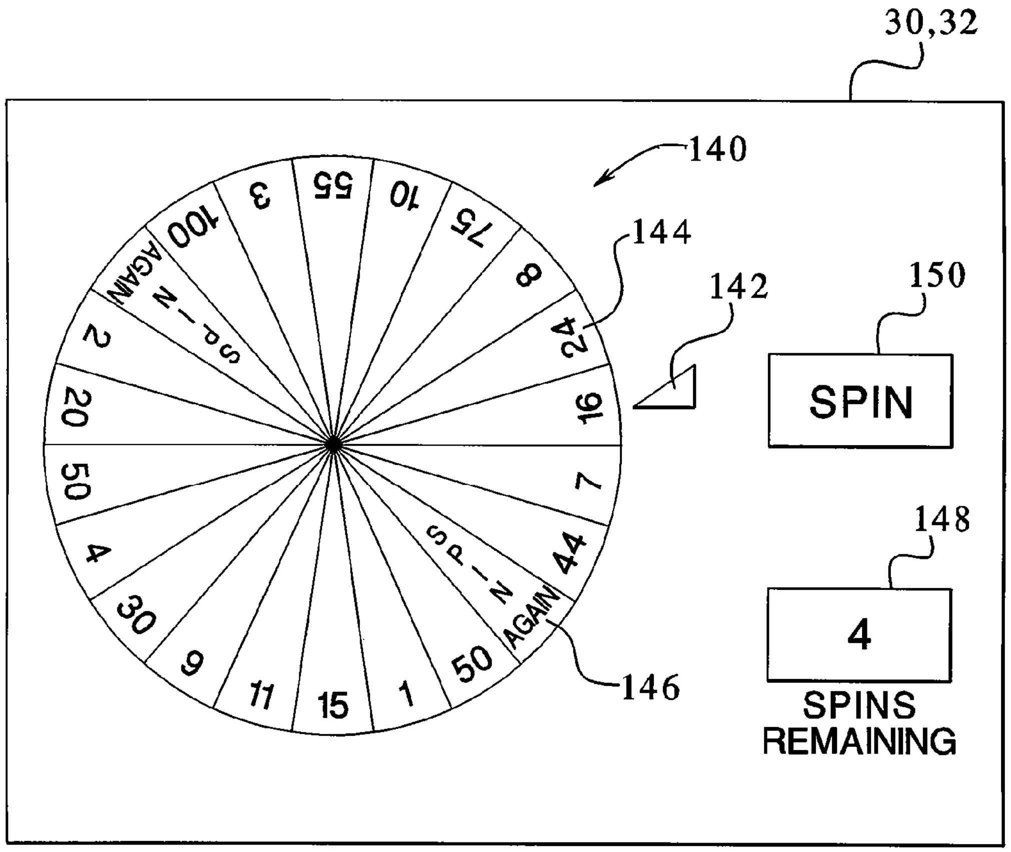
FIG. 6 an enlarged front plan view of a display device illustrating one preferred embodiment of the present invention.

Referring now to FIG. 6, one preferred embodiment of the present invention includes one of the display devices 30 or 32, displaying a rotatable wheel 140 having twenty-two equally sized pie-shaped sections. A cursor 142 designates one of the rotatable sections at all times. The present invention includes the wheel 140 and cursor 142 being electromechanical or simulated and preferably electromechanical. Twenty award sections 144 include an award. Two spin sections 146 include a retry or re-spin of the present invention. The preferred wheel embodiment is preferably employed in IGT's Wheel of Fortune game. It should be appreciated that the wheel embodiment, as well as other random generation devices, is applicable in many different games.

In the preferred embodiment, the game preferably maintains the same odds of generating a retry or re-spin, e.g., 11:1, regardless of the number of chances or opportunities currently held by the player. The game thus employs the same wheel at all times. If necessary, the chance limit or governor described above may be used to accomplish the desired game math and maintain profitability of the gaming device. It should be appreciated, however, that the gaming device may alternatively employ any odds of generating a retry or re-spin, wherein the odds vary or remain constant throughout the game. The spin sections alternatively include awards in addition to the retry function. The pie shape sections further alternatively include no symbols or ghost symbols, wherein the player receives no award or retry.

The wheel embodiment of the present invention preferably includes an electromechanical or simulated spins remaining meter or indicator 148. The game also preferably includes an electromechanical or simulated spins button or selector 150. A player thus inputs a decision to execute one of the remaining spins of the wheel as shown in the spins remaining indicator 148 by selecting the spin selector 150. The wheel 140 spins and stops, whereby the cursor 142 designates the award or retry of a randomly generated, adjacent pie shaped section.

It should be appreciated that the preferred embodiment of FIG. 6 illustrates one of many different random generation devices that employ the retry or re-spin method of the present invention. The present invention includes one or more wheels having any number of pie-shaped sections, one or more reels having any number of stops or symbols, one or more cards, one or more dice, or any number of any device embodying a random number of generation.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of a processor, the gaming device comprising:

at least one input device;

at least one display device; and at least one memory device configured to store:

(i) data representing:

(a) a primary game controllable by the processor and operable upon a wager by a player;

(b) a plurality of primary game symbols in the primary game;

(c) a plurality of different primary game winning symbol combinations in the primary game;

(d) a plurality of different primary game awards associated with the primary game winning symbol combinations in the primary game;

(e) at least one triggering condition reachable in the primary game;

(f) a secondary game controllable by the processor and operable upon an occurrence of the triggering condition in a play of the primary game, the secondary game being different than the primary game;

(g) a plurality of secondary game outcomes associated with the secondary game;

(h) a plurality of secondary game awards associated with the secondary game outcomes; and (i) at least one free play condition reachable in the secondary game, the free play condition associated with at least one of a plurality of different quantities of free plays which are usable in the primary game, each one of the different quantities of free plays being greater than one; and (ii) a plurality of instructions, which when executed by the processor, cause the processor to operate with the at least one input device and the at least one display device to:

(a) receive an input associated with the wager from the at least one input device;

(b) start the primary game;

(c) determine one of the primary game awards in response to one of the primary game winning symbol combinations being generated;

(d) start the secondary game in response to an occurrence of the triggering condition;

(e) generate in the secondary game one of the secondary game outcomes independent of any skill by the player;

(f) determine the secondary game award associated with the generated secondary game outcome;

(g) cause the processor to select one of the plurality of different quantities of free plays that can be selected when the secondary game award is determined, the selected quantity of free plays being based on the generated secondary game outcome;

(h) generate a total quantity of free plays in the primary game by adding the selected quantity of free plays with any remaining free plays in the primary game which were not previously used;

(i) indicate the total quantity of free plays on the at least one display device;

(j) restart the primary game; and (k) operate the total quantity of free plays in the primary game.

2. The gaming device of claim 1, wherein the primary game includes a game selected from the group consisting of a slot game, a game having a plurality of rotatable reels, a poker game, and a keno game.

3. The gaming device of claim 2, wherein the secondary game includes a game selected from the group consisting of a bonus game, a bonus round game, a bonus game involving a wheel having a plurality of sections, a bonus game involving at least one indicator operable to indicate the quantity of free plays, a bonus game involving a video wheel, and a bonus game involving a mechanical wheel.

4. The gaming device of claim 1, wherein the selected quantity of free plays is at least two.

5. The gaming device of claim 1, wherein the triggering condition reachable in the primary game is associated with a quantity of secondary game plays, the quantity of secondary game plays being at least one.

6. The gaming device of claim 5, wherein the quantity of secondary game plays is at least two.

7. The gaming device of claim 6, wherein the selected quantity of free plays for the primary game is based on the quantity of secondary game plays.

8. The gaming device of claim 7, wherein the selected quantity of free plays is different than the quantity of secondary game plays.

9. The gaming device of claim 5, wherein the selected quantity of free plays for the primary game is based on the quantity of secondary game plays.

10. The gaming device of claim 9, wherein the selected quantity of free plays for the primary game is equal to the quantity of secondary game plays.

11. The gaming device of claim 9, wherein the selected quantity of free plays for the primary game is based on a difference between: (a) the quantity of secondary game plays; and (b) how many of the secondary game plays have been used when the free play condition is reached.

12. The gaming device of claim 1, which includes at least one additional condition, the additional condition associated with a limit specifying a maximum quantity of free plays for the primary game.

13. The gaming device of claim 1, wherein the secondary game includes a difference from the primary game, the difference including a characteristic selected from the group consisting of: (a) a different game type; (b) a different game logic; (c) a different graphical interface; (d) a different game symbol; and (e) a different paytable.

14. A gaming device operable under control of a processor, the gaming device comprising:

at least one input device;

at least one display device; and at least one memory device configured to store:

(i) data representing:

(a) a primary game controllable by the processor and operable upon a wager by a player, the primary game having a plurality of rotatable reels; (b) a plurality of primary game symbols in the primary game;

(c) a plurality of different primary game winning symbol combinations in the primary game;

(d) a plurality of different primary game awards associated with the primary game winning symbol combinations in the primary game;

(e) at least one triggering condition reachable in the primary game;

(f) a secondary game controllable by the processor and operable upon an occurrence of the triggering condition in a play of the primary game, the secondary game being different than the primary game;

(g) a plurality of secondary game outcomes associated with the secondary game;

(h) a plurality of secondary game awards associated with the secondary game outcomes; and (i) at least one extra play condition reachable in the secondary game, the extra play condition associated with at least one of a plurality of different quantities of extra plays which are usable in the primary game, each one of the different quantities of extra plays being at least one; and (ii) at least one program which, when executed by the processor, causes the processor to operate with the at least one input device and the at least one display device to:

(a) receive an input associated with the wager;

(b) start the primary game;

(c) determine one of the primary game awards in response to one of the primary game winning symbol combinations being generated;

(d) start the secondary game in response to an occurrence of the triggering condition;

(e) generate in the secondary game one of the secondary game outcomes independent of any skill by the player;

(f) determine the secondary game award associated with the generated secondary game outcome;

(g) cause the processor to select one of the plurality of different quantities of extra plays that can be selected when the secondary game award is determined, the selected quantity of extra plays being based on one or more of the generated outcomes of the primary game or the secondary game;

(h) generate a total quantity of free plays in the primary game by adding the selected quantity of extra plays with any remaining free plays in the primary game which were not previously used;

(i) indicate the total quantity of free plays on the at least one display device;

(j) restart the primary game; and (k) operate the total quantity of free plays in the primary game.

15. The gaming device of claim 14, wherein the secondary game includes a game selected from the group consisting of a bonus game, a bonus round game, a bonus game involving a wheel having a plurality of sections, a bonus game involving at least one indicator operable to indicate the quantity of extra plays, a bonus game involving a video wheel, and a bonus game involving a mechanical wheel.

16. The gaming device of claim 14, wherein the selected quantity of extra plays is at least two.

17. The gaming device of claim 14, wherein the triggering condition reachable in the primary game is associated with a quantity of secondary game plays, the quantity of secondary game plays being at least one.

18. The gaming device of claim 17, wherein the quantity of secondary game plays is at least two.

19. The gaming device of claim 18, wherein the selected quantity of extra plays for the primary game is based on the quantity of secondary game plays.

20. The gaming device of claim 19, wherein the selected quantity of extra plays is different than the selected quantity of secondary game plays.

21. The gaming device of claim 17, wherein the selected quantity of extra plays for the primary game is based on the quantity of secondary game plays.

22. The gaming device of claim 21, wherein the selected quantity of extra plays for the primary game is equal to the quantity of secondary game plays.

23. The gaming device of claim 21, wherein the selected quantity of extra plays for the primary game is based on a difference between: (a) the quantity of secondary game plays; and (b) how many of the secondary game plays have been used when the extra play condition is reached.

24. The gaming device of claim 14, which includes at least one additional condition, the additional condition associated with a limit specifying a maximum quantity of extra plays for the primary game.

25. The gaming device of claim 14, wherein the secondary game includes a difference from the primary game, the difference including a characteristic selected from the group consisting of: (a) a different game type; (b) a different game logic; (c) a different graphical interface; (d) a different game symbol; and (e) a different paytable.

26. A method for operating a gaming device, the method comprising:

(a) receiving a wager from a player using an input device;

(b) starting a primary game;

(c) displaying a plurality of primary game symbols in the primary game;

(d) displaying a plurality of different primary game winning symbol combinations in the primary game;

(e) providing an opportunity to receive at least one of a plurality of different primary game awards associated with at least one of the primary game winning symbol combinations in the primary game;

(f) enabling at least one triggering condition to be reached in the primary game;

(g) starting a secondary game after the triggering condition occurs in a play of the primary game, wherein the secondary game is different than the primary game;

(h) generating in the secondary game one of the secondary game outcomes independent of any skill by the player;

(i) providing an opportunity to receive at least one of a plurality of different secondary game awards in the secondary game;

(j) providing an opportunity to reach at least one free play condition in the secondary game, wherein: (x) the free play condition is associated with at least one of a plurality of different quantities of free plays which are usable in the primary game, and (y) each of the different quantities of free plays is greater than one;

(k) causing a processor to select one of the plurality of different quantities of free plays that can be selected when a secondary game is awarded and when the free play condition is reached, the selected quantity of free plays being based on the generated secondary game outcome;

(l) generating a total quantity of free plays in the primary game by adding the selected quantity of free plays with any remaining free plays in the primary game which were not previously used;

(m) indicating the total quantity of free plays on a display device;

(n) restarting the primary game; and (o) operating the total quantity of free plays in the primary game.

27. The method of claim 26, wherein starting the primary game includes starting a game selected from the group consisting of a slot game, a game having a plurality of rotatable reels, a poker game, and a keno game.

28. The method of claim 27, wherein starting the secondary game includes starting a game selected from the group consisting of a bonus game, a bonus round game, a bonus game involving a wheel having a plurality of sections, a bonus game involving at least one indicator operable to indicate the quantity of free plays, a bonus game involving a video wheel, and a bonus game involving a mechanical wheel.

29. The method of claim 26, which includes providing at least two of the free plays.

30. The method of claim 26, which includes associating the triggering condition reachable in the primary game with a quantity of secondary game plays, the quantity of secondary game plays being at least one.

31. The method of claim 30, which includes providing at least two secondary game plays.

32. The method of claim 31, which includes basing the quantity of free plays for the primary game on the quantity of secondary game plays.

33. The method of claim 30, which includes basing the quantity of free plays for the primary game on the quantity of secondary game plays.

34. The method of claim 33, which includes providing at least two free plays.

35. The method of claim 33, which includes equating the quantity of free plays for the primary game to the quantity of secondary game plays.

36. The method of claim 33, which includes basing the quantity of free plays for the primary game on a difference between: (a) the quantity of secondary game plays; and (b) how many of the secondary game plays have been used when the free play condition is reached.

37. The method of claim 26, which includes associating at least one additional condition with a limit specifying a maximum quantity of free plays for the primary game.

38. The method of claim 26, which includes providing a difference between the primary game and the secondary game, wherein the difference includes a characteristic selected from the group consisting of: (a) a different game type; (b) a different game logic; (c) a different graphical interface; (d) a different game symbol; and (e) a different paytable.

* * * * *